United States Patent Office 3,565,651
Patented Feb. 23, 1971

3,565,651
ADHESIVE PROCESS
Doyle H. Waggle, Webster Groves, Mo., assignor to Ralston Purina Company, St. Louis, Mo., a corporation of Missouri
No Drawing. Filed Aug. 19, 1968, Ser. No. 753,737
Int. Cl. C08h 7/00
U.S. Cl. 106—154                 5 Claims

ABSTRACT OF THE DISCLOSURE

A method of producing an adhesive is disclosed. The adhesive is produced by reacting carbohydrate material or carbohydrate precursors at high pressure to convert the carbohydrate material to an adhesive. The reaction can be catalyzed by acid and can be performed continuously in an extrusion cooker.

---

It is known in the art to produce dextrin adhesives from starch by reacting the starch at high temperatures. The known processes usually employ a weak hydrochloric acid catalyst and a lengthy roasting step which may require as much as eight hours or more to complete the reaction. Such a process is disclosed in U.S. Pat. 2,944,913 or in U.S. Pat. 3,224,903. Starch core binders produced by extruding starchy material at temperatures sufficient to gelatinize the starch are also known, as shown by U.S. Pat. 3,159,505. The gelatinized starch adhesives perform satisfactorily as core binders but they do not have adhesive properties necessary to perform well where greater bond strength is required or where it is desirable to use small quantities of adhesive to effect a bond. The present invention provides a process for making an adhesive having superior properties as an adhesive and which produces the material continuously by reacting carbohydrates or carbohydrate precursors in an extrusion cooker. The reaction can be carried to the point necessary to produce a satisfactory product in less than 5 minutes. By reducing the time required to produce the conversion, a substantial reduction in the cost of the material produced is gained.

By carbohydrates or carbohydrate precursors we mean materials which contain a significant amount of carbohydrate or break up to form carbohydrates and include starches, tubers, grains, carbohydrate containing oil seed meals, and cellulose products, such as grain hulls, straw and wood. The grains include milo, corn, oats, barley, rye, rice and wheat or their milled parts, such as grits, flour, bran, germ and mill feed. The oil seed meals include soybean, cottonseed, rapeseed, safflower, and castor bean. The grains may be extruded directly or they may be introduced to the extruder in a comminuted form. The material is preferably acidified and extruded at a low moisture content and high pressure. The step of acidifying makes it possible to extrude the material at low moisture content and high pressure. These conditions are necessary to successfully react the material to form the desired adhesive without extensive consumption of power. The acidification makes possible the economical production of the adhesive, and unexpectedly promotes the adhesive properties of the reacted product. The product could possibly be produced by extruding the material at a low moisture content and very high pressure conditions without adding acid. At present there are no machines available to accurately test this hypothesis; however, preliminary tests indicate that it may be possible. The present method makes economical production of the material possible with the machinery currently available.

I believe that the high pressure conditions in the reactor partially convert the carbohydrate material to a dextrin product having superior adhesive properties. However, the exact reaction product of the extrusion reaction has not been determined. In the case of any particular carbohydrate material, the processing herein is such that the normal carbohydrate constituent is modified to have an increased solubility, preferably above 35%, and the reducing sugar content of the material is increased.

The acidified material is extruded with a low moisture content. Preferably the pH is adjusted by addition of an acid such as HCl, $H_3PO_4$, $H_2SO_4$, acetic acid, or other comparable heavy acids to a range of about 1 to 6.6. The pH is measured by mixing 15 grams of the material in 120 grams of water and measuring the pH of the mixture with a pH meter. Concentrated acids are preferred in order to maintain a low moisture content of the material. The reaction of the material proceeds rapidly under the high pressure conditions in the extruder. Normally the the extruder in less than 5 minutes. To perform the reaction satisfactorily, the pressure of the material upstream of the extrusion die should be maintained at between 100 and 10,000 p.s.i.g. A pressure above 300 p.s.i.g. is preferred. The material is expelled from the extruder at a temperature well above the boiling point of water. The space into which the extruded material is transferred is at atmospheric pressure. The moisture present in the material boils or flashes to the atmosphere. Since the material has a very low moisture content prior to extrusion and the moisture present in the material flashes to atmosphere, it is not usually necessary to dry the product by additional means. The material is taken from the extruder after flashing to a substantially dry state. The product will remain at an elevated temperature at this point and it may be necessary to cool the material before processing it further.

The property of not requiring drying prior to further processing makes the material even more economical, because it avoids the additional cost of operating a dryer. Even if drying is necessary, the material has a sufficiently low moisture content to make additional drying very economical. After being expelled from the extruder, the material is cooled, if necessary, and ground. The ground product is suitable for use as an adhesive. The adhesive properties of the material are enhanced by finely grinding the material. A finely ground product will provide superior bond with less material than a coursely ground product. Preferably the material is ground to a particle size of 25 mesh or finer.

The method of producing the adhesive will be more apparent from the following examples.

EXAMPLE 1

Fifty pounds of whole corn was ground on a hammer mill having a perforated screen with ⅛" openings. The ground corn was acidified by adding 162 ml. of 70% $H_3PO_4$ to the ground corn. The acidified grain was then tempered by conducting the ground corn through a screw chamber preconditioner with water and steam added to adjust the moisture content to about 18% by weigh. The pH of the tempered grain was 4.3. The acidified grain was extruded through an extrusion cooker having a 4" screw and a ¼" die opening. Pressurized steam was introduced to the extruder jacket. The grain was extruded at 370 p.s.i.g. and 308° F. measured at a point 1½" upstream of the die. The dwell time in the extruder was about 35 seconds. The product expelled from the extruder flashed its moisture when exposed to atmospheric pressure. The product was cut into about ½" pieces by a rotating knife as it was expelled from the extruder and was conveyed to a cooler. The product leaving the cooler was at ambient temperature. The dry ambient product was ground on a Schultz-O'Neill grinder to a particle size of less than 50 mesh. The pH of the final product was 4.1.

EXAMPLE 2

Fifty pounds of whole corn was processed as described in Example 1 by adding 324 ml. of 70% $H_3PO_4$ and tempering to obtain an intiail moisture content of 18.4% and a pH of 3.6. The material was extruded on the apparatus of Example 1 at 300 p.s.i.g. and 256° F. The product was cooled and ground as described in Example 1, and had a final pH of 3.4.

EXAMPLE 3

Fifty pounds of whole wheat was processed as described in Example 1 by adding 162 ml. of 70% $H_3PO_4$ and tempering to obtain an initial moisture content of 18.0% and a pH of 5.5. The material was extruded on the apparatus of Example 1 at 400 p.s.i.g. and 250° F. The product was cooled and ground as described in Example 1 and had a final pH of 5.2.

EXAMPLE 4

Fifty pounds of whole wheat was processed as described in Example 1 by adding 324 ml. of 70% $H_3PO_4$ and tempering to obtain an initial moisture content of 19.0% and a pH of 4.5. The material was extruded on the apparatus of Example 1 at 400 p.s.i.g. and 240° F. The product was cooled and ground as described in Example 1 and had a final pH of 4.3.

EXAMPLE 5

Fifty pounds of whole oats were processed as described in Example 1 by adding 162 ml. of 70% $H_3PO_4$ and tempering to obtain an initial moisture content of 18.7%, and a pH of 5.0. The material was extruded on the apparatus of Example 1 at 500 p.s.i.g. and 256° F. The product was cooled and ground as described in Example 1 and had a final pH of 4.8.

EXAMPLE 6

Fifty pounds of whole oats were processed as described in Example 1 by adding 324 ml. of 70% $H_3PO_4$ and tempering to obtain an initial moisture content of 19.3% and a pH of 3.3. The material was extruded on the apparatus of Example 1 at 500 p.s.i.g. and 295° F. The product was cooled and ground as described in Example 1 and had a final pH of 3.1.

EXAMPLE 7

Fifty pounds of whole barley was processed as described in Example 1 by adding 162 ml. of 70% $H_3PO_4$ and tempering to obtain an initial moisture content of 18.2% and a pH of 4.8. The material was extruded on the apparatus of Example 1 at 500 p.s.i.g. and 294° F. The product was cooled and ground as described in Example 1 and had a final pH of 4.6.

EXAMPLE 8

Fifty pounds of whole barley was processed as described in Example 1 by adding 324 ml. of 70% $H_3PO_4$ and tempering to obtain an initial moisture content of 18.0%, and a pH of 3.6. The material was extruded on the apparatus of Example 1 at 540 p.s.i.g. and 294° F. The product was cooled and ground as described in Example 1 and had a final pH of 3.4.

EXAMPLE 9

Fifty pounds of 50% protein soybean meal was processed as described in Example 1 by adding 162 ml. of 70% $H_3PO_4$ and tempering to obtain an initial moisture content of 17.3% and a pH of 6.2. Material was extruded in the apparatus for Example 1 at 480 p.s.i.g. and 312° F. Product was cooled and ground as described in Example 1 and had a final pH of 5.9.

EXAMPLE 10

Fifty pounds of 50% protein soybean meal was processed as described in Example 1 by adding 324 ml. of 70% $H_3PO_4$ and tempering to obtain an initial moisture content of 18.7% and a pH of 5.9. The material was extruded on the apparatus of Example 1 at 400 p.s.i.g. and 328° F. The product was cooled and ground as described in Example 1 and had a final pH of 5.6.

EXAMPLE 11

Fifty pounds of ground milo was processed as described in Example 1 by adding 141 ml. of 36% HCl and tempering to obtain an initial moisture content of 19.1% and a pH of 4.8. The material was extruded on the apparatus of Example 1 and the product was dried and then cooled as described in Example 1. The cooled product was ground on a Fitz Mill having a perforated screen with .033″ openings to a particle size of less than 25 mesh. The material had a final pH of 4.5.

EXAMPLE 12

Fifty pounds of ground milo was processed as described in Example 1 by adding 146 ml. of 70% $H_3PO_4$ and tempering to obtain an initial moisture content of 17.7% and a pH of 4.8. The material was extruded on the apparatus of Example 1 and the product was cooled as described in Example 1. The product was ground as described in Example 11. The final pH of the product was 4.6.

EXAMPLE 13

Fifty pounds of ground milo was processed as described in Example 1 by adding 115 ml. of 98% $H_2SO_4$ and tempering to obtain an initial moisture content of 17.3% and a pH of 3.7. The material was extruded on the apparatus of Example 1. The product was cooled as described in Example 1 and ground as described in Example 11. The final pH of the product was 3.5.

EXAMPLE 14

Fifty pounds of ground milo was processed as described in Example 1 by adding 227 ml. of glacial acetic acid and tempering to obtain an initial moisture content of 18.5% and a pH of 5.0. The material was extruded on the apparatus of Example 1. The product was cooled as described in Example 1 and ground as described in Example 11. The final pH of the product was 4.8.

EXAMPLE 15

Fifty pounds of ground milo was processed as described in Example 1 by adding 972 ml. of 70% $H_3PO_4$ and tempering to obtain an initial moisture content of 19.7%, and a pH of 2.3. The material was extruded on the apparatus of Example 1. The product was dried and then cooled as described in Example 1 and ground as described in Example 11. The final pH of the product was 2.1.

The adhesive material produced by the method of this invention can be used for a wide variety of purposes. The following examples illustrate some of the uses for the adhesive material. Other uses of the material will be readily apparent to those skilled in the art.

EXAMPLE 16

The composition produced by the method of Example 10 was mixed in a commercially available turkey ration at a 2% by weight level. This mixture was processed into a pellet approximately 3″ x ⅜″ x ⅜″ in a laboratory pelleting device. A pellet containing no adhesive was made under identical conditions as the pellet containing the adhesive of Example 10. The force required to break the pellets was measured and expressed as pounds force per gram of pellet weight.

TABLE I

| Pellet: | Lbs./gm. pellet wt. |
|---|---|
| No adhesive | 0.160 |
| 2% Example 10 | 0.241 |

The product of Example 10 made a pellet having superior strength as a result of the great adhesive properties of the material.

EXAMPLE 17

The adhesive made as described in Example 15 was tested as a pellet adhesive in a commercially available turkey finisher feed formulation. The adhesive made as described in Example 15 was compared with a commercially available calcium ligno-sulfate binder. Both binders were added to the commercially available turkey ration at a 2% by weight level. A negative control having no adhesive addition was used. The pellets were formed on a California laboratory pellet mill having a die with ⅛″ openings. Two measurements were made to judge the effectiveness of the adhesive. These were a standard pneumatic hardness measurement and a standard abrasion index determined by the screen method.

The screen test measured the durability of the pellets by determining the percent of the pellets remaining after being agitated on a screen to remove fines. Fines are particulates of broken pellets which pass through the screen.

TABLE II

| Pellet | Hardness | Abrasion Index |
|---|---|---|
| No Adhesive | 10.8 | 26.2 |
| 2% Example 15 | 12.6 | 58.5 |
| 2% Calcium Ligno-Sulfate | 10.9 | 31.5 |

The larger the hardness and abrasion index are, the more resistant the pellets are to breakage or deterioration in storage and handling. It is desirable to have a pellet resistant to breakage because of fines created in the pelleting operation, in shipment of the pellets, and in feeding the pellets. From the above data, one can conclude that both the calcium lignosulfate composition and the composition described in Example 15 were effective in increasing the hardness and abrasive properties of the pelleted ration. However, the composition described in Example 15 significantly increased the hardness and abrasive resistant properties of the pelleted ration over the proven, commercially available product. The hardness of the pellet having the adhesive of Example 15 was increased 25% over the calcium ligno-sulfate and the abrasion resistance was increased 85%. Increased pellet strength of this order is wholly unprecedented. The adhesive of Example 15 has the added advantage of being made from a nutritious base, milo. This makes it possible to incorporate this product into pelleted rations without reducing the nutritive value of the resulting pelleted product. This product can be used at levels of .5 to 75% by weight of the pelleted feed without upsetting the nutrient balance.

Other uses for the adhesive of this invention are for binding wood chips to form wallboard and in forming charcoal briquettes. I have also discovered that the product by Example 2 makes a superior rewetting paper adhesive.

EXAMPLE 18

To produce a paper adhesive, five grams of the material of Example 2 were mixed with 5 ml. of water and applied to a sheet of paper in a thin film and allowed to dry. The dried film was rewetted and a sheet of paper applied over the adhesive. The bonded surfaces were allowed to dry and the force required to separate the surfaces were measured. 1.07 lbs. force was required to separate the paper surfaces held together by five grams of the material of Example 2.

What is claimed is:

1. The method of producing an adhesive comprising grinding a grain material selected from the group consisting of milo, corn, oats, barley, rye, rice and wheat and acidifying the whole grain material to a pH of 1 to 6.6 with an acid selected from the group consisting of phosphoric acid, sulphuric acid, hydrochloric acid and acetic acid, reacting the whole grain material at a pressure of 100–10,000 p.s.i.g. reducing the moisture content of the reacted material to produce a substantially dry material, and grinding the material to reduce the particle size.

2. The method of claim 1 wherein the grain material is selected from the group consisting of corn and whole milo.

3. The method of claim 1 wherein the whole grain material is reacted at a moisture content of about 20% by weight.

4. The method of claim 1 wherein the particle size of the dry material is reduced to about 25 mesh.

5. An adhesive material produced by the method of claim 1.

References Cited
UNITED STATES PATENTS

| | | | |
|---|---|---|---|
| 3,137,592 | 3/1961 | Protzman | 127—32 |
| 2,443,290 | 6/1948 | Bauer | 106—210X |
| 3,251,703 | 5/1966 | Fortney | 106—150X |

OTHER REFERENCES

LORENZO B. HAYES, Primary Examiner

U.S. Cl. X.R.

106—210, 213

UNITED STATES PATENT OFFICE
CERTIFICATE OF CORRECTION

Patent No. 3,565,651           Dated February 23, 1971

Inventor(s) Doyle H. Waggle

It is certified that error appears in the above-identified patent and that said Letters Patent are hereby corrected as shown below:

Column 2, line 17, after "Normally the" insert --reactic will be completed and the material expelled from--; same Co. 2, Example 1, line 58, "weigh" should read --weight--; Colur Example 2, line 4, "intiail" should read --initial--; Colum Example 17, line 22, "particulates" should read --particles Column 6, line 1, "-duce" should read --duct--; same Column line 6, after "-duct" insert --produced--.

Signed and sealed this 13th day of July 1971.

(SEAL)
Attest:

EDWARD M. FLETCHER, JR.
Attesting Officer

WILLIAM E. SCHUYLER,
Commissioner of Paten